(12) United States Patent
Jia et al.

(10) Patent No.: US 10,183,286 B2
(45) Date of Patent: *Jan. 22, 2019

(54) NOBLE METAL ZEOLITE CATALYST FOR SECOND-STAGE HYDROCRACKING TO MAKE MIDDLE DISTILLATE

(71) Applicants: Jifei Jia, Hercules, CA (US); Andrew Rainis, Walnut Creek, CA (US); Theodorus Luvidocus Michael Maesen, Moraga, CA (US); Richard Joseph Coser, Fairfield, CA (US); Yihua Zhang, Albany, CA (US); Thomas Michael Rea, Vacaville, CA (US)

(72) Inventors: Jifei Jia, Hercules, CA (US); Andrew Rainis, Walnut Creek, CA (US); Theodorus Luvidocus Michael Maesen, Moraga, CA (US); Richard Joseph Coser, Fairfield, CA (US); Yihua Zhang, Albany, CA (US); Thomas Michael Rea, Vacaville, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 251 days.

This patent is subject to a terminal disclaimer.

(21) Appl. No.: 14/823,839

(22) Filed: Aug. 11, 2015

(65) Prior Publication Data

US 2017/0043330 A1 Feb. 16, 2017

(51) Int. Cl.

| B01J 29/06 | (2006.01) |
|---|---|
| B01J 29/80 | (2006.01) |
| B01J 35/00 | (2006.01) |
| B01J 37/00 | (2006.01) |
| B01J 37/04 | (2006.01) |
| B01J 23/88 | (2006.01) |
| B01J 23/888 | (2006.01) |
| B01J 29/08 | (2006.01) |
| B01J 29/70 | (2006.01) |
| B01J 37/02 | (2006.01) |
| B01J 37/08 | (2006.01) |
| C10G 47/18 | (2006.01) |
| B01J 29/12 | (2006.01) |
| B01J 29/74 | (2006.01) |

(52) U.S. Cl.
CPC ............ *B01J 29/80* (2013.01); *B01J 23/88* (2013.01); *B01J 23/888* (2013.01); *B01J 29/084* (2013.01); *B01J 29/7007* (2013.01); *B01J 35/002* (2013.01); *B01J 35/0006* (2013.01); *B01J 35/0026* (2013.01); *B01J 37/0009* (2013.01); *B01J 37/0018* (2013.01); *B01J 37/0201* (2013.01); *B01J 37/0207* (2013.01); *B01J 37/0236* (2013.01); *B01J 37/04* (2013.01); *B01J 37/08* (2013.01); *C10G 47/18* (2013.01); *B01J 29/126* (2013.01); *B01J 29/7415* (2013.01); *B01J 2229/186* (2013.01); *B01J 2229/20* (2013.01); *B01J 2229/42* (2013.01)

(58) Field of Classification Search
CPC ...... B01J 29/80; B01J 29/126; B01J 29/7415; B01J 2229/186; B01J 2229/20; B01J 2229/42; B01J 35/0006; B01J 35/002; B01J 35/0026; B01J 37/04; B01J 37/08; B01J 37/0009
USPC ............... 502/60, 64, 66, 67, 69, 74, 79
See application file for complete search history.

(56) References Cited

U.S. PATENT DOCUMENTS

| 4,740,292 | A | 4/1988 | Chen et al. |
|---|---|---|---|
| 5,160,033 | A | 11/1992 | Vassilakis et al. |
| 5,228,979 | A | 7/1993 | Ward |
| 5,275,720 | A | 1/1994 | Ward |
| 5,279,726 | A | 1/1994 | Ward et al. |
| 5,350,501 | A | 9/1994 | Ward et al. |
| 5,447,623 | A | 9/1995 | Ward et al. |
| 5,853,566 | A | 12/1998 | Kraushaar-Czarnetzki et al. |
| 5,954,944 | A | 9/1999 | Zhang et al. |
| 7,048,845 | B2 | 5/2006 | Bauer |
| 7,169,291 | B1 | 1/2007 | Wang |
| 7,323,100 | B2 | 1/2008 | Espinoza et al. |
| 2001/0001449 | A1 | 5/2001 | Kiliany et al. |
| 2005/0197249 | A1* | 9/2005 | Creyghton ............ B01J 23/888 502/439 |
| 2007/0102322 | A1 | 5/2007 | Wang |
| 2011/0000824 | A1* | 1/2011 | Zhan ................... B01J 35/1066 208/300 |
| 2012/0275993 | A1* | 11/2012 | Olson .................. C01B 39/026 423/700 |

FOREIGN PATENT DOCUMENTS

| WO | 2007056045 A1 | 5/2007 |
|---|---|---|
| WO | 2008011289 A2 | 1/2008 |
| WO | 2008011291 A2 | 1/2008 |
| WO | 2008016888 A2 | 2/2008 |

* cited by examiner

*Primary Examiner* — Elizabeth D Wood
(74) *Attorney, Agent, or Firm* — Susan M. Abernathy; Mark L. Warzel

(57) ABSTRACT

A second-stage hydrocracking catalyst is provided, comprising: a) a zeolite beta having an OD acidity of 20 to 400 µmol/g and an average domain size from 800 to 1500 nm2; b) a zeolite USY having an ASDI between 0.05 and 0.12; c) a catalyst support; and d) 0.1 to 10 wt % noble metal; wherein the second-stage hydrocracking catalyst provides a hydrogen consumption less than 350 SCFB across a range of synthetic conversions up to 37 wt % when used to hydrocrack hydrocarbonaceous feeds having an initial boiling point greater than 380° F. (193° C.). A second-stage hydrocracking process using the second-stage hydrocracking process is provided. A method to make the second-stage hydrocracking catalyst is also provided.

11 Claims, 6 Drawing Sheets

NOBLE METAL ZEOLITE CATALYST FOR SECOND-STAGE HYDROCRACKING TO MAKE MIDDLE DISTILLATE

This application is related to two co-filed applications titled "MIDDLE DISTILLATE HYDROCRACKING CATALYST CONTAINING ZEOLITE BETA WITH LOW OD ACIDITY AND LARGE DOMAIN SIZE" and "MIDDLE DISTILLATE HYDROCRACKING CATALYST CONTAINING ZEOLITE USY, AND ZEOLITE BETA WITH LOW ACIDITY AND LARGE DOMAIN SIZE", herein incorporated in their entireties.

TECHNICAL FIELD

This application is directed to a second-stage hydrocracking catalyst, a process for second-stage hydrocracking of a hydrocarbonaceous feed, and a method for making a second-stage hydrocracking catalyst.

BACKGROUND

Improved second-stage hydrocracking catalysts and processes for using them and making them are needed. Earlier second-stage hydrocracking catalysts have not provided the desired improved levels of activity to make high quality middle distillates. Earlier second-stage hydrocracking catalysts have provided good yields of middle distillate and heavy naphtha, but at lower activity that what is optimal.

SUMMARY

This application provides a second-stage hydrocracking catalyst, comprising: a zeolite beta having an OD acidity of 20 to 400 nmol/g and an average domain size from 800 to 1500 nm2; b. a zeolite USY having an ASDI between 0.05 and 0.12; c. a catalyst support; and d. 0.1 to 10 wt % noble metal; wherein the second-stage hydrocracking catalyst provides a hydrogen consumption less than 350 SCFB across a range of synthetic conversions up to 37 wt % when used to hydrocrack hydrocarbonaceous feeds having an initial boiling point greater than 380° F. (193° C.).

This application also provides a second-stage hydrocracking process, comprising: hydrocracking a hydrocarbonaceous feed having an initial boiling point greater than 380° F. (193° C.) in a second-stage hydrocracking reactor using a second-stage hydrocracking catalyst, wherein greater than 70 wt % of an effluent from the second-stage hydrocracking reactor has a hydrocracked boiling point greater than 380° F. (193° C.) and wherein the second-stage hydrocracking catalyst provides a hydrogen consumption less than 350 SCFB across a range of synthetic conversions up to 37 wt %; wherein the second-stage hydrocracking catalyst comprises:
  a. a zeolite beta having an OD acidity of 20 to 400 μmol/g and an average domain size from 800 to 1500 nm2;
  b. a zeolite USY having an ASDI between 0.05 and 0.12;
  c. a catalyst support; and
  d. 0.1 to 10 wt % noble metal.

This application also provides a method for making a second-stage hydrocracking catalyst, comprising:
  a. mixing together a zeolite beta having an OD acidity of 20 to 400 μmol/g and an average domain size from 800 to 1500 nm$^2$, a zeolite USY having an ASDI between 0.05 and 0.12, a catalyst support, and enough liquid to form an extrudable paste;
  b. extruding the extrudable paste to form an extrudate base;
  c. impregnating the extrudate base with a metal impregnation solution containing at least one noble metal to make a metal-loaded extrudate; and
  d. post-treating the metal-loaded extrudate by subjecting the metal-loaded extrudate to drying and calcination;
wherein the second-stage hydrocracking catalyst provides a hydrogen consumption less than 350 SCFB across a range of synthetic conversions up to 37 wt % when used to hydrocrack hydrocarbonaceous feeds having an initial boiling point greater than 380° F. (193° C.).

The present invention may suitably comprise, consist of, or consist essentially of, the elements in the claims, as described herein.

GLOSSARY

Figure 1:
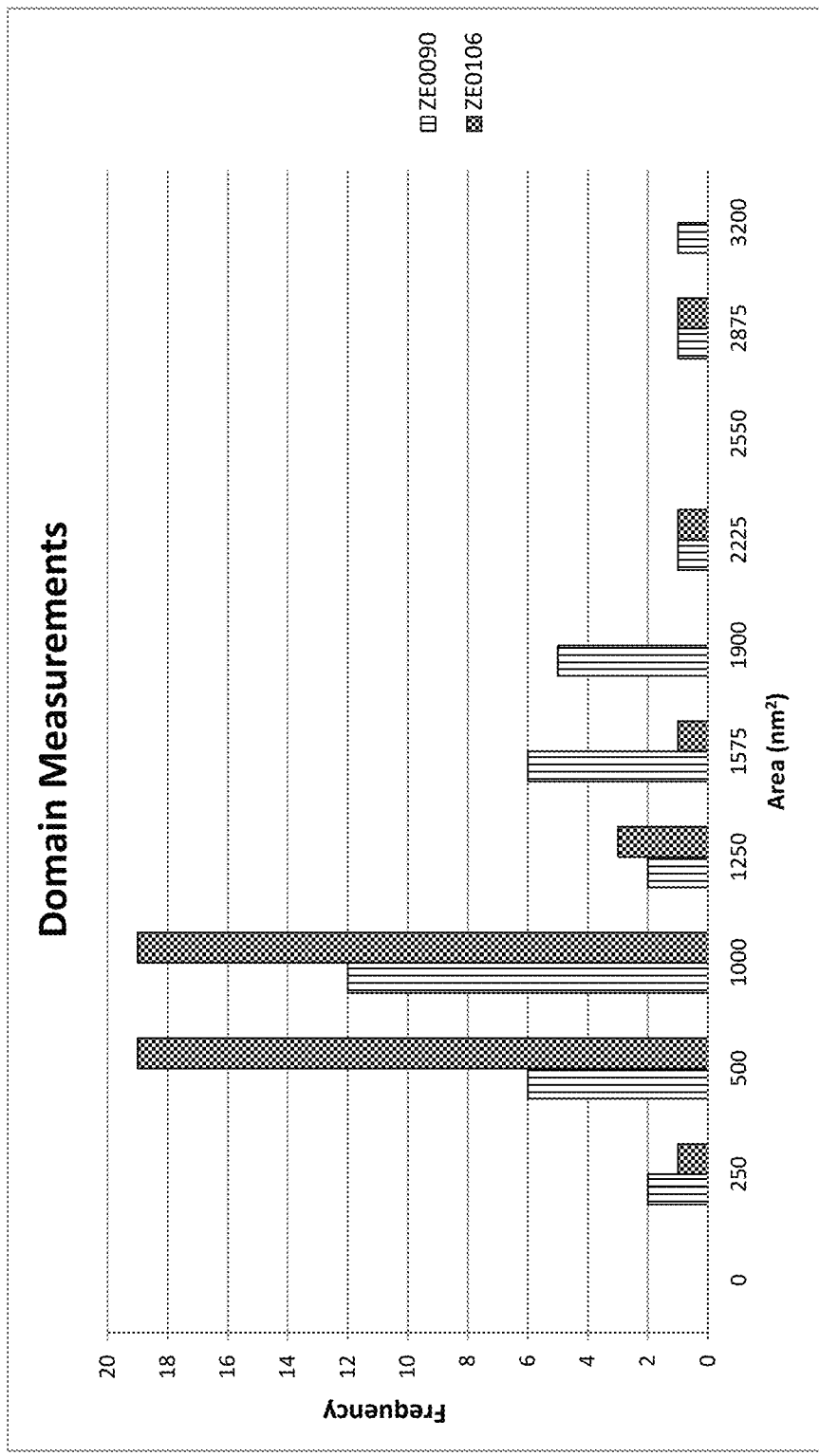
FIG. 1 is a chart of the domain measurements made on two samples of zeolite beta.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins(naphthenes) into non-cyclic branched paraffins.

"Second-stage hydrocracking" refers to a process for hydrocracking a hydrocarbonaceous feed produced in a first-stage hydroprocessing reactor. The second-stage hydrocracking is done in a second-stage hydrocracking reactor that is fluidly connected to the first-stage hydroprocessing reactor.

"TBP" refers to the boiling point of a hydrocarbonaceous feed or product, as determined by ASTM D2887-13.

"Cut point" refers to the temperature on a True Boiling Point (TBP) curve at which a predetermined degree of separation is reached.

"Hydrocarbonaceous" means a compound or substance that contains hydrogen and carbon atoms, and which can include heteroatoms such as oxygen, sulfur, or nitrogen.

"Hydrocracked boiling point" refers to the boiling point of a hydrocarbonaceous product produced in a hydrocracking reactor.

"Middle Distillates" include products having cut points from 380° F. to 625° F. Middle distillates can include jet (380-566° F.) and diesel (566-625° F.).

"Finished catalyst" refers to the second-stage hydrocracking catalyst composition comprising all of its components and after all of the processing and any post-processing steps used to manufacture it.

"LHSV" means liquid hourly space velocity.

"WHSV" means weight hourly space velocity.

"SCFB" refers to a unit of standard cubic foot of gas (e.g., nitrogen, hydrogen, air, etc) per barrel of hydrocarbonaceous feed.

"$SiO_2/Al_2O_3$ mole ratio (SAR) is determined by inductively coupled plasma (ICP) elemental analysis. A SAR of infinity means there is no aluminum in the zeolite, i.e., the mole ratio of silica to alumina is infinity. In that case, the zeolite is comprised of essentially all silica.

"Zeolite beta" refers to zeolites having a 3-dimensional crystal structure with straight 12-membered ring channels with crossed 12-membered ring channels, and having a framework density of about 15.3 T/1000 Å$^3$. Zeolite beta has a BEA framework as described in Ch. Baerlocher and L. B. McCusker, Database of Zeolite Structures: http://www.iza-structure.org/databases/

"Zeolite USY" refers to ultra-stabilized Y zeolite. Y zeolites are synthetic faujasite (FAU) zeolites having a SAR of 3 or higher. Y zeolite can be ultra-stabilized by one or more of hydrothermal stabilization, dealumination, and isomorphous substitution. Zeolite USY can be any FAU-type zeolite with a higher framework silicon content than a starting (as-synthesized) Na—Y zeolite precursor.

"Catalyst support" refers to a material, usually a solid with high surface area, to which a catalyst is affixed.

"Periodic Table" refers to the version of the IUPAC Periodic Table of the Elements dated Jun. 22, 2007, and the numbering scheme for the Periodic Table Groups is as described in Chemical And Engineering News, 63(5), 27 (1985).

"OD acidity" refers to the amount of bridged hydroxyl groups exchanged with deuterated benzene at 80° C. by Fourier transform infrared spectroscopy (FTIR). OD acidity is a measure of the Brönsted acid sites density in a catalyst. The extinction coefficient of OD signals was determined by analysis on a standard zeolite beta sample calibrated with $^1$H magic-angle spinning nuclear magnetic resonance (MAS NMR) spectroscopy. A correlation between the OD and OH extinction coefficients was obtained as following:

$$\varepsilon_{(-OD)} = 0.62 \cdot \varepsilon_{(-OH)}.$$

"Domain Size" is the calculated area, in nm$^2$, of the structural units observed and measured in zeolite beta catalysts. Domains are described by Paul A. Wright et. al., "Direct Observation of Growth Defects in Zeolite Beta", JACS Communications, published on web Dec. 22, 2004. The method used to measure the domain sizes of zeolite beta is further described herein.

"Acid site distribution index (ASDI)" is an indicator of the hyperactive site concentration of a zeolite. ASDI is determined by the following equation: ASDI=(HF'+LF')/(HF+LF). In some embodiments, the lower the ASDI the more likely the zeolite will have a greater selectivity towards the production of heavier middle distillate products.

"Amorphous silica aluminate (ASA)" refers to a synthetic material having some of the alumina present in tetrahedral coordination as shown by nuclear magnetic resonance imaging. ASA can be used as a catalyst or catalyst support. Amorphous silica alumina contains sites which are termed Brönsted acid (or protic) sites, with an ionizable hydrogen atom, and Lewis acid (aprotic), electron accepting sites and these different types of acidic site can be distinguished by the ways in which, say, pyridine attaches.

"Pseudo-boehmite alumina refers to an aluminum compound with the chemical composition AlO(OH). Pseudo-boehmite alumina consists of finely crystalline boehmite with a higher water content than boehmite.

"API gravity" refers to the gravity of a petroleum feedstock or product relative to water, as determined by ASTM D4052-11.

"Polycyclic index (PCI)" refers to a measure of the content of compounds having several aromatic rings. PCI is useful in evaluating feedstocks for hydroprocessing. PCI is measured using UV-spectroscopy and is calculated as follows:

PCI={[Absorbance@385 nm−(0.378×Absorbance@435 nm)]/115×c}×1000; where c is the original concentration of the sample in solvent in g/cm$^3$.

"Noble metal" refers to a metal that is resistant to corrosion and oxidation in moist air (unlike most base metals). Examples of noble metals are ruthenium, rhodium, palladium, silver, osmium, iridium, platinum, and gold.

"Particle density" refers to the density of a catalyst including its pore volume in g/l, and can be measured by mercury porosimetry. The determination of particle density is based on the fact that mercury does not wet the surface of most materials, and therefore, will not enter the pores of a solid catalyst unless forced to under pressure. The particle density can be measured either volumetrically or gravimetrically by fully immersing the catalyst sample in mercury. In the gravimetric method, the equation for particle density (D) is: D=(C×ρ)/(A+B−C), where C is the catalyst sample weight, A is the weight of the test cell filled with mercury, B is the weight of the test cell with both the catalyst sample and mercury, and p is the density of mercury. In the volumetric method, the equation for particle density (D) is: D=C/ΔV, where ΔV is the difference in volume measurement in the test cell with and without the catalyst sample.

"Catalyst Activation Temperature (C.A.T.)" in the context of this disclosure refers to the temperature needed to reach a 30 wt % conversion target less than 625° F. (329° C.).

DETAILED DESCRIPTION

The distribution of the acid sites of a zeolite generally determines the catalytic activity and selectivity towards particular refining products. The ASDI provides a measurement of the super acid site concentration of a zeolite. During the commercial operation of a hydrocracking unit, the concentrations of the acid sites can increase, leading to increased hydrocracking of the hydrocarbonaceous feedstock. The increased hydrocracking can cause increased production of lesser value products such as light naphtha and $C_1$-$C_4$ gas.

Without being bound by theory, it is believed that the unique combination of zeolite beta with a defined OD acidity and a defined average domain size, combined with a zeolite USY with a defined acid site distribution index (ASDI), supported on a catalyst support and impregnated with one or more noble metals provides a much improved second-stage hydrocracking catalyst. The unique combination of these components in a second-sage hydrocracking catalyst gives improved hydrogen consumption, generally less than 350 SCFB across a range of synthetic conversion<625° F. (329° C.) from 23 to 37 wt % while providing excellent selectivity for producing a hydrocracked effluent having a TBP of 380-625° F. The second-stage hydrocracking catalyst can also provide improved activity, such as from 1 to 30° F. at 30% conversion compared to other second-stage hydrocracking catalysts that do not have the unique combination of components disclosed herein.

Second-Stage Hydrocracking Catalyst Composition—Zeolite Beta:

The zeolite beta has an OD acidity of 20 to 400 µmol/g and an average domain size from 800 to 1500 nm². In one embodiment, the OD acidity is from 30 to 100 µmol/g.

In one embodiment the zeolite beta is synthetically manufactured using organic templates. Examples of three different zeolite beta are described in Table 1.

TABLE 1

| Zeolite Betas | SiO₂/Al₂O₃ Molar Ratio (SAR) | OD Acidity, µmol/g |
|---|---|---|
| H-BEA-35 | 35 | 304 |
| H-BEA-150 (ZE0090) | 150 | 36 |
| CP811C-300 (ZE0106) | 300 | Not measured |

The total OD acidity was determined by H/D exchange of acidic hydroxyl groups by FTIR spectroscopy. The method to determine the total OD acidity was adapted from the method described in the publication by Emiel J. M. Hensen et. al., J. Phys. Chem., C2010, 114, 8363-8374. Prior to FTIR measurement, the sample was heated for one hour at 400-450° C. under vacuum<1×10⁻⁵ Torr. Then the sample was dosed with $C_6D_6$ to equilibrium at 80° C. Before and after $C_6D_6$ dosing, spectra were collected for OH and OD stretching regions. Brönsted acid sites density (OD acidity) was determined by using the integrated area of peak 2660 cm⁻¹ for zeolite beta.

The average domain size was determined by a combination of transmission electron (TEM) and digital image analysis, as follows:

I. Zeolite Beta Sample Preparation:

The zeolite beta sample was prepared by embedding a small amount of the zeolite beta in an epoxy and microtoming. The description of suitable procedures can be found in many standard microscopy text books.

Step 1. A small representative portion of the zeolite beta powder was embedded in epoxy. The epoxy was allowed to cure.

Step 2. The epoxy containing a representative portion of the zeolite beta powder was microtomed to 80-90 nm thick. The microtome sections were collected on a 400 mesh 3 mm copper grid, available from microscopy supply vendors.

Step 3. A sufficient layer of electrically-conducting carbon was vacuum evaporated onto the microtomed sections to prevent the zeolite beta sample from charging under the electron beam in the TEM.

II. TEM Imaging:

Step 1. The prepared zeolite beta sample, described above, was surveyed at low magnifications, e.g., 250,000-1,000,000× to select a crystal in which the zeolite beta channels can be viewed.

Step 2. The selected zeolite beta crystals were tilted onto their zone axis, focused to near Scherzer defocus, and an image was recorded>2,000,000×.

III. Image Analysis to Obtain Average Domain Size (nm²):

Step 1. The recorded TEM digital images described previously were analyzed using commercially available image analysis software packages.

Step 2. The individual domains were isolated and the domain sizes were measured in nm². The domains where the projection was not clearly down the channel view were not included in the measurements.

Step 3. A statistically relevant number of domains were measured. The raw data was stored in a computer spreadsheet program.

Step 4. Descriptive statistics, and frequencies were determined—The arithmetic mean, ($d_{av}$), or average domain size, and the standard deviation (s) were calculated using the following equations:

The average domain size, $d_{av} = (å\, n_i d_i)/(å\, n_i)$

The standard deviation, $s = (å(d_i - d_{av})^2/(å\, n_i))^{1/2}$

In one embodiment the average domain size is from 900 to 1250 nm², such as from 1000 to 1150 nm².

Second-Stage Hydrocracking Catalyst Composition—Zeolite USY:

The zeolite USY has an acid site distribution index (ASDI) between 0.05 and 0.12. In one embodiment, the zeolite USY has an ASDI that favors the production of heavy middle distillates.

ASDI is determined by H/D exchange of acidic hydroxyl groups by FTIR spectroscopy, as described previously. Brönsted acid sites density was determined by using the integrated area of peak 2676 cm⁻¹ as the first high frequency OD (HF), 2653 cm⁻¹ as the $2^{nd}$ high frequency OD (HF'), 2632 cm⁻¹ and 2620 cm⁻¹ as the first low frequency OD (LF) and 2600 cm⁻¹ as the $2^{nd}$ low frequency OD (LF'). The acid site distribution index factor was determined by the following equation: ASDI=(HF'+LF')/(HF+LF); which reflects the hyperactive acid sites content in the zeolite sample. In one embodiment the zeolite USY has a total Brönsted acid sites determined by FTIR after H/D exchange of 0.080 to 0.200 mmol/g.

In one embodiment, the wt % of the zeolite beta is greater than the wt % of the zeolite USY in the hydrocracking catalyst. For example, the wt % of the zeolite beta can be from 0.45 to 9.95 wt % greater than the wt % of the zeolite USY. In one embodiment, the wt % of the zeolite beta is from 1 to 5 wt % higher than the wt % of the zeolite USY. In one embodiment, the hydrocracking catalyst has a weight ratio of the zeolite USY to the zeolite beta that is less than 0.90, such as from 0.01 to 0.80, or from 0.02 to 0.48.

Second Stage Hydrocracking Catalyst Composition—Catalyst Support:

The hydrocracking catalyst comprises a catalyst support. The catalyst support can be inert or can participate in the catalytic reactions performed by the hydrocracking catalyst. Typical catalyst supports include various kinds of carbon, alumina, and silica. In one embodiment, the catalyst support comprises an amorphous silica aluminate. In one embodiment, the catalyst support comprises an amorphous silica aluminate and a second support material.

In one embodiment, the amorphous silica aluminate (ASA) has greater thermal stability than high purity aluminas. Examples of suitable amorphous silica aluminates are SIRAL® ASAs, described below:

TABLE 2

| Typical Properties | | SIRAL 1 | SIRAL 5 | SIRAL 10 | SIRAL 20 | SIRAL 30 | SIRAL 40 |
|---|---|---|---|---|---|---|---|
| Al₂O₃ + SiO₂ | % | 75 | 75 | 75 | 75 | 75 | 75 |
| Loss on Ignition (LOI) | % | 25 | 25 | 25 | 25 | 25 | 25 |
| Al₂O₃:SiO₂ | % | 99:1 | 95:5 | 90:10 | 80:20 | 70:30 | 60:40 |

TABLE 2-continued

| Typical Properties | | SIRAL 1 | SIRAL 5 | SIRAL 10 | SIRAL 20 | SIRAL 30 | SIRAL 40 |
|---|---|---|---|---|---|---|---|
| C | % | 0.2 | 0.2 | 0.2 | 0.2 | 0.2 | 0.2 |
| $Fe_2O_3$ | % | 0.02 | 0.02 | 0.02 | 0.02 | 0.02 | 0.02 |
| $Na_2O$ | % | 0.005 | 0.005 | 0.005 | 0.005 | 0.005 | 0.005 |
| Loose bulk density | [g/l] | 600-800 | 450-650 | 400-600 | 300-500 | 250-450 | 250-450 |
| Particle size ($d_{50}$) | [µm] | 50 | 50 | 50 | 50 | 50 | 50 |
| Surface area (BET)* | [m²/g] | 280 | 370 | 400 | 420 | 470 | 500 |
| Pore volume* | [ml/g] | 0.50 | 0.70 | 0.75 | 0.75 | 0.80 | 0.90 |

*After activation at 550° C. for 3 hours.

SIRAL® is a registered trademark of SASOL.

Examples of the second support material, when used, can include kieselguhr, alumina, silica, and silica-alumina Other examples of the second support material include alumina-boria, silica-alumina-magnesia, silica-alumina-titania and materials obtained by adding zeolites and other complex oxides thereto. In one embodiment, the second support material is porous, and comprises a natural clay or a synthetic oxide. The second support material can be selected to provide adequate mechanical strength and chemical stability at the reaction conditions under which the hydrocracking catalyst is employed.

In one embodiment, the second support material comprises a pseudo-boehmite alumina Examples of pseudo-boehmite alumina are CATAPAL® high purity aluminas CATAPAL® is a registered trademark of SASOL. Typical properties of the CATAPAL high purity aluminas are summarized below:

TABLE 3

| Typical Properties | CATAPAL B | CATAPAL C1 | CATAPAL D | CATAPAL 200 |
|---|---|---|---|---|
| $Al_2O_3$, wt % | 72 | 72 | 76 | 80 |
| $Na_2O$, wt % | 0.002 | 0.002 | 0.002 | 0.002 |
| Loose Bulk Density, g/l | 670-750 | 670-750 | 700-800 | 500-700 |
| Packed Bulk Density, g/l | 800-1100 | 800-1100 | 800-1100 | 700-800 |
| Average Particle size ($d_{50}$), µm | 60 | 60 | 40 | 40 |
| Surface Area* (BET), m²/g | 250 | 230 | 220 | 100 |
| Pore Volume*, ml/g | 0.50 | 0.50 | 0.55 | 0.70 |
| Crystal size, nm | 4.5 | 5.5 | 7.0 | 40 |

*Surface area and pore volume were determined after activation at 550° C. for 3 hours.

In one embodiment, the second alumina has a second alumina BET surface area that is high enough such that the second-stage hydrocracking catalyst has a BET surface area from 450 to 650 m²/g. For example, the second alumina can have a second alumina BET surface area greater than 150 m²/g, such as from 155 to 350 m²/g, from 200 to 300 m²/g, or from 220 to 280 m²/g.

In one embodiment, the second alumina has an alumina compacted bulk density greater than 700 g/l, such as from 800 to 1100 g/l.

Second-Stage Hydrocracking Catalyst Composition— Noble Metal:

The second-stage hydrocracking catalyst additionally comprises at least one noble metal. The total amount of a noble metal in the second-stage hydrocracking catalyst is from 0.1 wt. % to 10 wt. % based on the bulk dry weight of the finished hydrocracking catalyst. In one embodiment, the noble metal is selected from the group of platinum, palladium, and mixtures thereof.

In different embodiments, the second-stage hydrocracking catalyst can have one or more of the following physical properties:
a. a compacted bulk density from 420 to 620 g/l,
b. a LOI (1000° F.[538° C.]) less than 12 wt %, or from 0.5 to less than 10 wt %,
c. a total PtPd H2 adsorption from 70 wt % to 98 wt %, and
d. a particle density from 800 to 1200 g/l.

In one embodiment, the second-stage hydrocracking catalyst is in the form of extruded pellets (extrudates) that have an extruded pellet diameter of 10 mm or less, such as from 1.0 to 5.0 mm. In one embodiment, the extruded pellet has a length-to-diameter ratio of 10 to 1. Examples of other types and sizes of pellets used for the second-stage hydrocracking catalysts are 1 to 10 mm diameter spheres; 1 to 10 mm diameter cylinders with a length-to-diameter ratio of 4 to 1; 1 to 10 mm asymmetric shapes (including quadrolobes), and up to 10 mm diameter hollow cylinders or rings.

The ° F. or ° C. more activity for a given catalyst is a commercially significant value since the overall kinetics of a hydrocracking process involves deactivation of the catalyst with time which requires the constant incremental increase in the operating temperature of the process as a function of time to maintain constant conversion of the hydrocarbon feedstock. The process equipment necessarily has temperature constraints such that when the process reaches a designated temperature the process must be shutdown, i.e., terminated, and the catalyst changed. Since these shutdowns are quite costly, a catalyst which provides the desired conversion at a lower temperature (as indicated by ° F. or ° C. more activity) has a longer life in the hydrocracking process since it requires a longer time to achieve the shutdown temperature. For example, the typical temperature increment for a commercial hydrocracking process can be on the order of 0.05 to 0.1° F. per day of operation and a catalyst which has 10° F. more activity can provide from 100 to 200 additional days of plant operation before catalyst changeover.

Hydrogen consumption is the amount of hydrogen consumed in the hydroprocessing reaction process. Hydrogen consumption is a key value driver for refineries. Reduction in hydrogen consumption will add values to refineries significantly.

Hydrogen consumption is measured with H NMR and calculated as follows:

Hydrogen consumption=Hydrogen in the product gas stream+Sum of hydrogen in the products−Hydrogen in the feed.

Second-Stage Hydrocracking Process

The second-stage hydrocracking catalysts described above can be used to hydrocrack hydrocarbonaceous feeds having an initial boiling point greater than 380° F. (193° C.).

In one embodiment, the hydrocarbonaceous feed comprises a first-stage hydrocracking reactor effluent. In another embodiment, the hydrocarbonaceous feed is a blend of an effluent from a first-stage hydrocracker and a raw feed, such as diesel. In one embodiment, the raw feed that is blended with the effluent from the first-stage hydrocracker is the feedstock to the first-stage hydrocracker. Examples of these types of raw feeds include visbroken gas oils, heavy coker gas oils, gas oils derived from residue hydrocracking or residue desulfurization, other thermally cracked oils, deasphalted oils, Fischer-Tropsch derived feedstocks, cycle oils from a fluid catalytic cracking (FCC) unit, heavy coal-derived distillates, coal gasification byproduct tars, heavy shale-derived oils, organic waste oils such as those from pulp or paper mills or from waste biomass pyrolysis units.

In one embodiment, the hydrocarbonaceous feed has a PCI less than 5000, such as from zero to less than 1000.

Table 4 lists some typical bulk properties for a hydrocarbonaceous feed that can be used.

TABLE 4

| Property | |
|---|---|
| API Gravity | 13.5-30.0 |
| N, ppm | 0-500 |
| S, wt % | 0-0.5 |
| Polycyclic Index (PCI) | 0-8000 |
| TBP Range, ° F. (° C.) | 381-1200° F. (194-649° C.) |

Table 5 lists some typical hydrocracking process conditions that can be used.

TABLE 5

| Property | |
|---|---|
| Liquid Hourly Space Velocity (LHSV), hr$^{-1}$ | 0.1-5 |
| H$_2$ partial pressure, psig (kPa) | 400-3,500 (2758-24,132) |
| H$_2$ Consumption Rate, SCF/B | 50-20,000 |
| H$_2$ Recirculation Rate, SCF/B | 50-9,000 |
| Operating Temperature | 200-450° C. (392-842° F.) |
| Conversion (wt %) | 20-100 |

Depending on the feedstock, target product slate and amount of available hydrogen, the second-stage hydrocracking catalyst described herein can be used alone or in combination with other conventional hydrocracking catalysts.

In one embodiment, the second-stage hydrocracking catalyst is deployed in one or more fixed beds in a second-stage hydrocracking unit, with or without recycle (once-through). Optionally, the second-stage hydrocracking unit may employ multiple second-stage units operated in parallel.

In one embodiment, the second-stage hydrocracking catalyst is deployed in one or more beds or units in a two-stage hydrocracking unit, with and without intermediate stage separation, and with or without recycle. Two-stage hydrocracking units can be operated using a full conversion configuration (meaning all of the hydrotreating and hydrocracking is accomplished within the hydrocracking loop via recycle). This embodiment may employ one or more distillation units within the hydrocracking loop for the purpose of stripping off product prior to the second stage hydrocracking step or prior to recycle of the distillation bottoms back to the first and/or second stage.

Two stage hydrocracking units can also be operated in a partial conversion configuration (meaning one or more distillation units are positioned within a hydrocracking loop for the purpose of stripping of one or more streams that are passed on for further hydroprocessing). Operation of the second-stage hydrocracking unit or reactor in this manner allows a refinery to hydroprocess highly disadvantaged feedstocks by allowing undesirable feed components such as the polynuclear aromatics, nitrogen and sulfur species (which can deactivate hydrocracking catalysts) to pass out of the hydrocracking loop for processing by equipment better suited for processing these components, e.g., an FCC unit.

In one embodiment, the second-stage hydrocracking catalyst is used in the second stage of a partial conversion, two-stage hydrocracking configuration which is well suited for making at least one middle distillate and a heavy vacuum gas fluidized catalytic cracking feedstock (HVGO FCC), by:

(a) hydrocracking a hydrocarbonaceous feedstock to produce a first stage hydrocracked effluent;

(b) distilling the hydrocracked feedstock by atmospheric distillation to form at least one middle distillate fraction and an atmospheric bottoms fraction;

(c) further distilling the atmospheric bottoms fraction by vacuum distillation to form a side-cut vacuum gas oil fraction and a heavy vacuum gas oil FCC feedstock;

(d) second-stage hydrocracking the side-cut vacuum gas oil fraction to form a second stage hydrocracked effluent; and (e) combining the second stage hydrocracked effluent with the first stage hydrocracked effluent.

The refinery configuration illustrated above has several advantages over conventional two-stage hydrocracking schemes. First, in this configuration, the catalyst and operating conditions of the first stage are selected to yield a HVGO FCC stream having only the minimum feed qualities necessary to produce FCC products which meet the established commercial specifications. This is in contrast to a conventional two-stage hydrocracking scheme where the first stage hydrocracking unit is operated at a severity necessary to maximize distillate yield which, in turn, requires the unit to be operated at more severe conditions (which requires more hydrogen and reduces the life of the catalyst).

Second, in this optional configuration, the side-cut vacuum gas oil (VGO) sent to the second stage hydrocracker unit is cleaner and easier to hydrocrack than a conventional second-stage hydrocracker feed. Therefore, higher quality middle distillate products can be achieved using a smaller volume of second-stage hydrocracking catalyst which, in turn, allows for the construction of a smaller hydrocracker reactor and consumption of less hydrogen. The second-stage hydrocracking unit configuration reduces construction cost, lowers catalyst fill cost and operating cost.

Second-Stage Hydrocracking Catalyst Preparation

The second-stage hydrocracking catalyst can be prepared by:

a. mixing together a zeolite beta having an OD acidity of 20 to 400 μmol/g and an average domain size from 800 to 1500 nm$^2$, a zeolite USY having an ASDI between 0.05 and 0.12, a catalyst support, and enough liquid to form an extrudable paste;

b. extruding the extrudable paste to form an extrudate base;

c. impregnating the extrudate base with a metal impregnation solution containing at least one noble metal to make a metal-loaded extrudate; and d. post-treating the metal-loaded extrudate by subjecting the metal-loaded extrudate to drying and calcination.

The liquid used in step a) can be water or a mild acid. In one embodiment the liquid used in step a) is a diluted $HNO_3$ acid aqueous solution with from 0.5 to 5 wt % $HNO_3$.

Prior to impregnation, the extrudate base can be dried at a temperature between 90° C. (194° F.) and 150° C. (302° F.) for 30 minutes to 3 hours. The dried extrudate base can then be calcined at one or more temperatures between 350° C. (662° F.) and 700° C. (1292° F.).

In one embodiment, the metal impregnation solution is made by dissolving metal precursors in a solvent. Suitable solvents include water, $C_1$-$C_3$ alcohols, ethers, and amines. In one embodiment, the solvent is deionized water. In one embodiment, the impregnation solution is adjusted to a basic pH, such as a basic pH greater than 8. In one embodiment, the metal impregnation solution has a basic pH from 9.1 to 9.5. The concentration of the impregnation solution can be determined by the pore volume of the support and by the selected metal loading.

In one embodiment, the extrudate base is exposed to the impregnation solution for 0.1 to 24 hours. If the second-stage hydrocracking catalyst comprises two or more metals, these metals can be impregnated sequentially or simultaneously.

In one embodiment the metal-loaded extrudate is dried at one or more temperatures in the range of 38° C. (100° F.) to 177° C. (350° F.) for 0.1 to 10 hours. The dried metal-loaded extrudate can be further calcined at one or more temperatures from 316° C. (600° F.) to 649° C. (1200° F.), with purging excess dry air, for 0.1 to 10 hours.

Products Made by Second-Stage Hydrocracking

The second-stage hydrocracking catalyst can produce optimized yields of products boiling above 380° F. (193° C.). In one embodiment, the second-stage hydrocracking process using the second-stage hydrocracking catalyst produces greater than 70 wt % of an effluent from the second-stage hydrocracking reactor having a hydrocracked boiling point greater than 380° F. (193° C.). In one embodiment, the second-stage hydrocracking catalyst provides desired selectivity for naphtha, jet fuel, and diesel. In one embodiment the second-stage hydrocracking process using the second-stage hydrocracking catalyst and processes described herein can produce an effluent that comprises less than 10 wt % boiling below 380° F. In one embodiment, the second-stage hydrocracking processes described herein produce an effluent from the second-stage hydrocracking reactor that comprises from 85 to 97 wt %, or from 90 to 95 wt %, products having a TBP boiling point from 380° F. (193° C.) to 700° F. (371° C.).

EXAMPLES

Example 1: Domain Size Analysis of Two Different Beta Zeolites

Domain size determinations were made on two samples of commercial zeolite betas. One sample was H-BEA-150 zeolite beta (ZE0090). The other sample was a comparison zeolite beta from Zeolyst International (CP811C-300, ZE0106) that had a higher SAR than H-BEA-150. The raw data and statistical analysis of the data for the domain size analysis is summarized below, in Table 6.

TABLE 6

| Domain Size Analysis | H-BEA-150 (ZE0090) | Comparison (ZE0106) |
|---|---|---|
| Average Domain Size (Mean), nm$^2$ | 1089.9 | 663.6 |
| Standard Error | 119.2 | 67.8 |
| Median | 907.2 | 530.2 |
| Standard Deviation | 715.5 | 454.8 |
| Sample Variance | 511881.8 | 206846.9 |
| Kurtosis | 1.2 | 7.8 |
| Skewness | 1.1 | 2.6 |
| Range | 2972.4 | 2358.0 |
| Minimum | 207.7 | 205.8 |
| Maximum | 3180.1 | 2563.8 |
| Sum | 39236.8 | 29862.5 |
| Total Count | 36.0 | 45.0 |
| Count of Small Domains, 200 to 600 nm$^2$ | 8 | 20 |
| Count of Large Domains, 1200 to 2000 nm$^2$ | 11 | 1 |
| Count of Extra Large Domains, 1500 to 3200 nm$^2$ | 9 | 2 |

Figure 2:
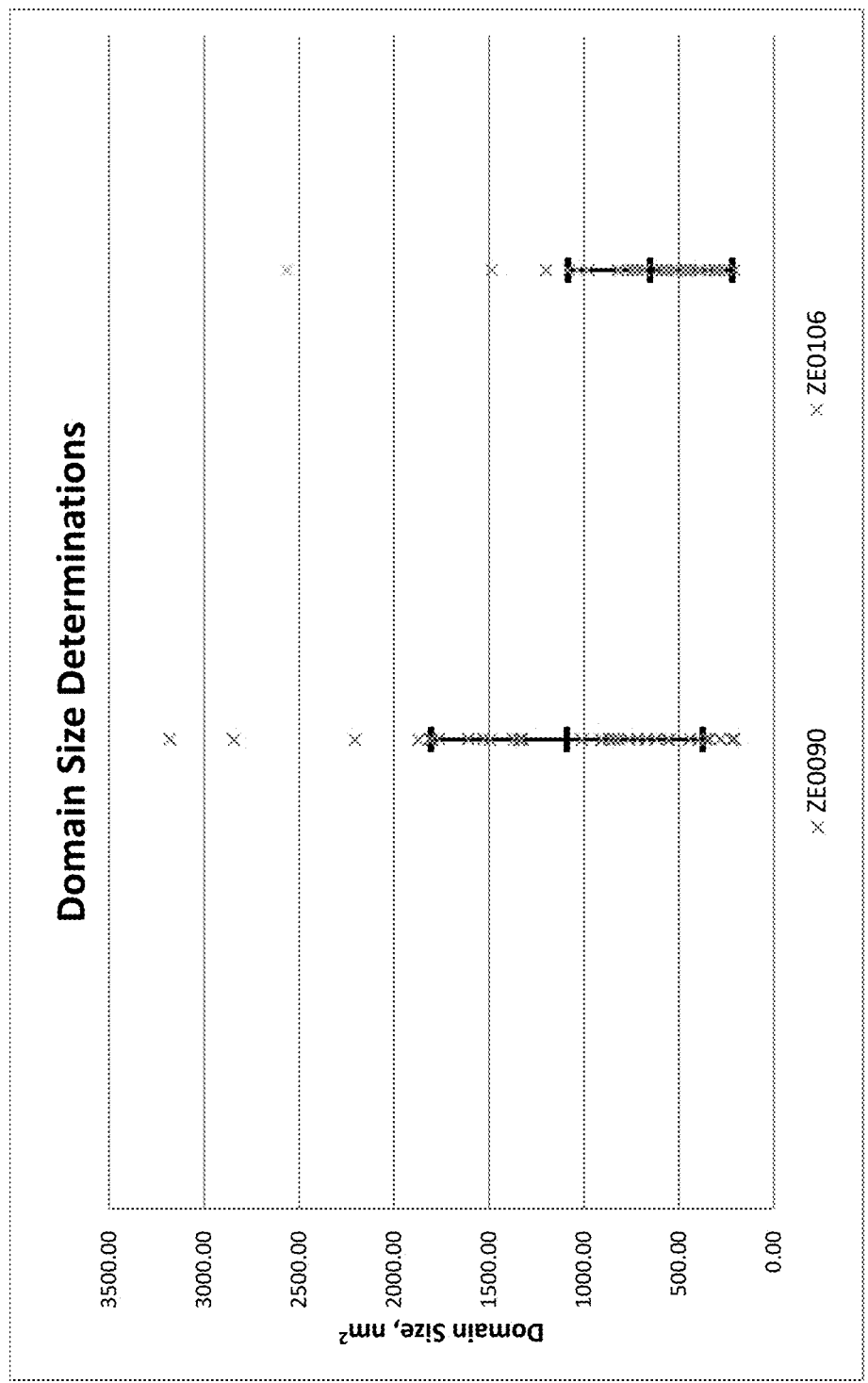
FIG. 2 is a chart of the average domain sizes of two samples of zeolite beta.

The data from these domain size analyses were also charted and are shown in FIGS. 1 and 2. FIG. 1 shows the differences in the frequency of the domain sizes between the two zeolite betas. FIG. 2 shows that the domain sizes for the H-BEA-150 were larger and more broadly distributed than those shown for the comparison zeolite beta. The standard deviation for the domain sizes for the H-BEA-150 was greater than 700 nm$^2$, while the standard deviation for the domain sizes for the comparison zeolite beta was less than 500 nm$^2$. Also, the H-BEA-150 zeolite beta had more large domains that had a domain size from 1200 to 2000 nm$^2$ than small domains that had a domain size from 200 to 600 nm$^2$; which is notably different that the distribution of the domain sizes in the comparison zeolite beta. The H-BEA-150 had a similar distribution (9 vs. 8) of extra large domains with a domain size from 1500 to 3200 nm$^2$ to small domains with a domain size from 200 to 600 nm$^2$. In this context, similar distribution means that the ratio of the count of domains in the two different domain size ranges is from 0.8:1 to 1.2:1.

Example 1: Preparation of Exemplary Catalyst Sample

An exemplary catalyst sample was prepared by combining, on a dry basis, 894.0 g SIRAL 40, 258.0 g CATAPAL B alumina, 13.2 g zeolite USY (A), and 34.8 zeolite beta (H-BEA-150); and mixing them well.

The properties of the ZEOLITE USY (A) are summarized in Table 7.

TABLE 7

| | |
|---|---|
| $SiO_2$/$Al_2O_3$ Mole Ratio | 60 |
| Nominal Cation Form | Hydrogen |
| $Na_2O$, Wt % | 0.03 |
| Unit Cell Size, Å | 24.24 |
| Surface Area, m$^2$/g | 720 |

The ZEOLITE USY (A) had an acid site distribution index (ASDI) of 0.086. Additional properties of the ZEOLITE USY (A) are summarized in Table 8.

TABLE 8

| Brönsted acid sites determined by FTIR after H/D exchange (mmol/g) | |
|---|---|
| HF(OD) | 0.076 |
| HF'(OD) | 0.005 |
| LF(OD) | 0.034 |
| LF'(OD) | 0.003 |
| Total OD Acidity | 0.118 |
| ASDI | 0.086 |

To this mixture described above, a diluted $HNO_3$ acid aqueous solution (3 wt %) was added to form an extrudable paste with 58 wt % volatiles. The extrudable paste was extruded into an asymmetric quadrolobe shape, and dried at 266° F. (130° C.) for 1 hour. The dried extrudates were calcined at 1100° F. (593° C.) for 1 hour with purging excess dry air, and cooled down to 300° F. (149° C.).

Pt and Pd were pore volume impregnated onto the dried extruded catalyst base described above by immersing the dried extruded catalyst base into a PtPd metal solution having a pH from 9.2-9.4. The PtPd metal solution was made by mixing 6.552 g $Pt(NH_3)_4(NO_3)_2$, 3.593 g $Pd(NH_3)_4(NO_3)_2$, ammonia water, and deionized water. 100 g (dry basis) of the dried extruded catalyst base was immersed in the PtPd metal solution at room temperature for twelve hours. The metal impregnated extruded catalyst was dried at 302° F. (150° C.) for 1 hour. The dried catalyst was then calcined at 815° F. (435° C.) for 1 hour with purging excess dry air, and cooled down to 300° F. (149° C.). The composition and physical properties of this finished Catalyst Sample are shown in Table 9.

Example 2: Comparative Catalyst Sample

A comparative Catalyst Sample was made by preparing the catalyst base and impregnating the base with Pt and Pd, similar to the steps used to prepare the Exemplary Catalyst Sample described in Example 1.

The catalyst compositions and physical properties of the catalyst sample from Example 1 and the comparative catalyst sample described here are shown in Table 9.

TABLE 9

Catalyst Compositions and Physical Properties

| | Comparative Catalyst Sample | Exemplary Catalyst Sample |
|---|---|---|
| Base Description | 16.0 wt % CATAPAL B, 80 wt % SIRAL 40, 4.0 wt % zeolite USY (A) | 21.5 wt % CATAPAL B, 74.5 wt % SIRAL 40, 2.9 wt % H-BEA-150 zeolite beta, 1.1 wt % zeolite USY (A) |
| Surface Area (BET), m²/g | 369 | 369 |
| N₂ Micropore Volume, cm³/g | 0.591 | 0.713 |
| Compacted Bulk Density, g/l | 591 | 519 |
| Particle Density, g/l | 1091.0 | 944.5 |
| LOI (1000° F.), wt % | 18.44 | 1.34 |
| Total PtPd H₂ Adsorption, wt % | 88.9 | 92.6 |
| Al₂O₃, wt % | 63.84 | 66.03 |
| SiO₂, wt % | 35.75 | 33.56 |
| PtO, wt % | 0.23 | 0.23 |
| PdO, wt % | 0.18 | 0.18 |

Surface area (BET) was measured by ASTM D3663-03 (Reapproved 2008).

N2 micropore volume was measured by ASTM D4365-13.

Compacted bulk density was measured by ASTM D4512-03(2013)ε1.

Particle density was measured by mercury porosimetry.

Loss on ignition [LOI (1000° F.)] was measured by ASTM D7348-13.

PtPd H2 adsorption was measured by ASTM D3908-03 (Reapproved 2008).

Example 3: Hydrocracking Second-Stage Feeds

The example catalysts described above were used to process a hydrocracking second-stage feed produced in first-stage ISOCRACKING® hydrocracking unit. The properties of this hydrocracking second-stage feed are described in Table 10.

TABLE 10

| API Gravity | 36.2 |
|---|---|
| N, ppm | 0.5 |
| S, wt % | <5 |
| H, wt % by NMR | 13.92 |
| Polycyclic Index (PCI) | 35 |
| 22 × 22 Mass Spec, vol % | |
| Paraffins | 41.5 |
| Naphthenes | 51.3 |
| Aromatics | 7.2 |
| Sulfur | 0.0 |
| TBP Range, ° F. (° C.) | |
| 0.5 | 437 |
| 5 | 492 |
| 10 | 524 |
| 30 | 610 |
| 50 | 669 |
| 70 | 720 |
| 90 | 800 |
| 95 | 838 |
| 99.5 | 926 |

ISOCRACKING® is a registered trademark of Chevron Intellectual Property LLC. ISOCRACKING processes are described in A. G. Bridge and U. K. Mukherjee, "Isocracking-Hydrocracking for Superior Fuels and Lube Production," Handbook of Petroleum Refining Processes, 3$^{rd}$ ed., R. A. Meyers ed., Chapter 7.1, McGraw-Hill, 2003.

Example 4: Comparison of Second-Stage Hydrocracking

Figure 3:
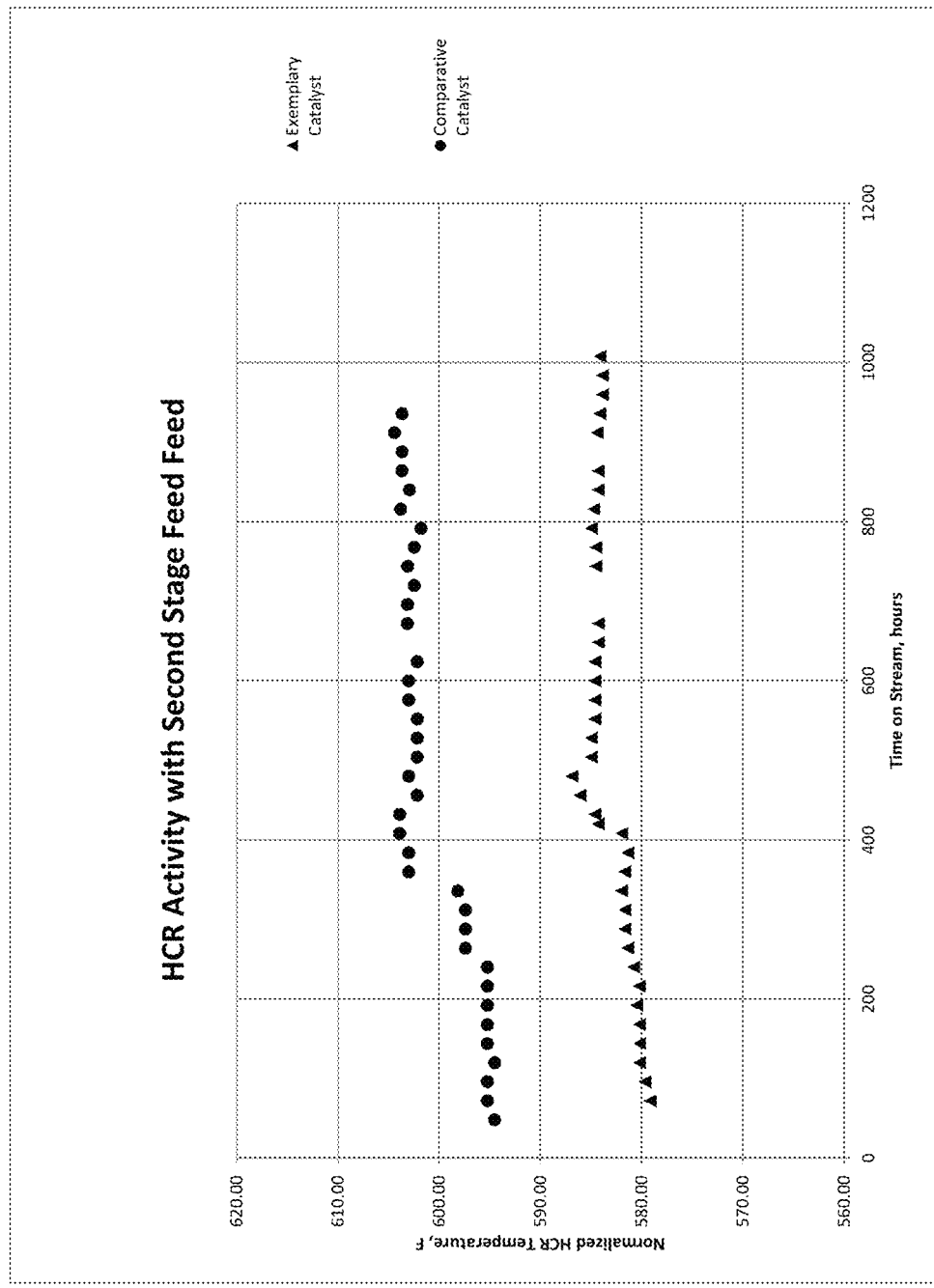
FIG. 3 is a chart showing the normalized hydrocracking temperatures vs. time on stream for two different second-stage hydrocracking catalysts.
Figure 6:
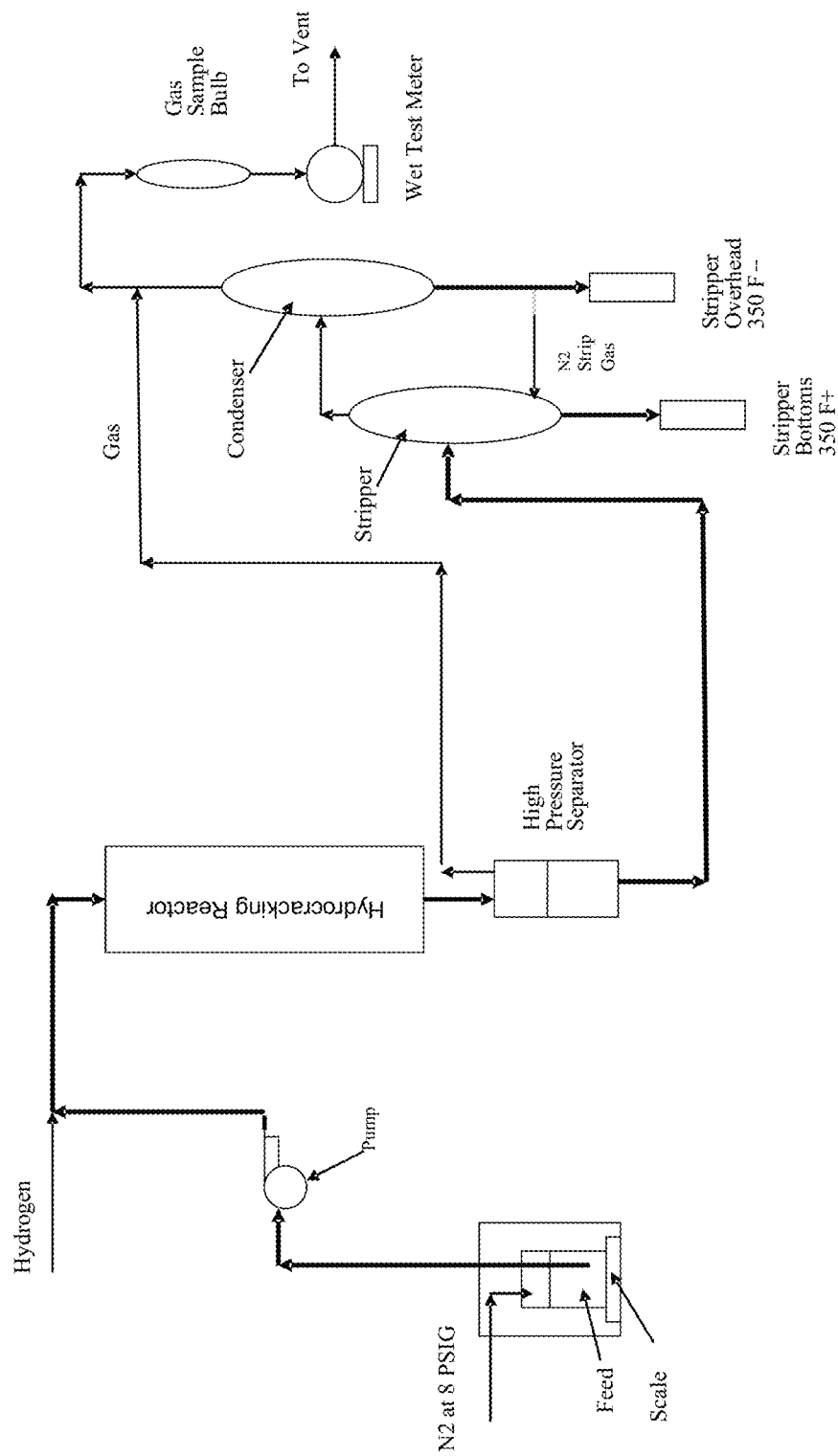
FIG. 6 is a diagram of the pilot plant used for the evaluation of the second-stage hydrocracking catalysts in this disclosure.

Hydrocracking tests were performed using the feed described in Example 3 in the pilot plant that is shown in FIG. 6. The hydrocracking process conditions during the tests included a total pressure of 1900 psig, a LHSV of 1.92, and 6,000 SCFB gas rate. The hydrocracking target was set at 30 wt % synthetic conversion less than 625° F. (329° C.). A chart showing the normalized hydrocracking temperatures over time on stream for two hydrocracking tests done with the exemplary catalyst sample described in Example 1 and the comparative catalyst sample described in Example 2 is shown in FIG. 3. The product yields at 30.0 wt % synthetic conversion less than 625° F. (329° C.), and the hydrogen consumption, are summarized below in Table 11.

TABLE 11

| | Catalyst | |
|---|---|---|
| | Comparative Catalyst Sample | Exemplary Catalyst Sample |
| No Loss Yields, wt % | | |
| C4- | 1.0 | 0.8 |
| $C_5$-380° F. | 10.5 | 8.3 |
| 380-566° F. | 28.4 | 29.2 |
| 566-625° F. | 15.0 | 16.7 |
| 625° F.+ | 46.1 | 46.0 |
| Mass Closure, Wt % | 99.19 | 99.59 |
| Hydrogen Consumption, SCFB | 365 | 297 |

FIG. 3 shows that the exemplary catalyst sample was 20° F. more active than the comparative catalyst sample over the total time on stream.

At the conditions tested, with 30.0 wt % synthetic conversion less than 625° F. (329° C.), the exemplary catalyst sample made 0.2 wt % less C4-, 2.2 wt % less $C_5$-380° F. naphtha, 0.8 wt % more 380-566° F. jet, and 1.7 wt % more 566-625° F. diesel.

Most of the jet, diesel and unconverted oil (UCO) properties were similar for the runs using the two different catalyst samples. The cloud points, however, were lowered when using the exemplary catalyst sample. Cloud points can be measured by ASTM D2500-11 or ASTM D5771-15. The cloud point for the jet made using the exemplary catalyst sample was −47° C., while the cloud point for the jet made using the comparative catalyst sample was −41° C. The cloud point for the diesel made using the exemplary catalyst sample was −16° C., while the cloud point for the diesel made using the comparative catalyst sample was only −7° C.

Example 5: Effect of Conversion on Hydrogen Consumption During Hydrocracking

Figure 4:
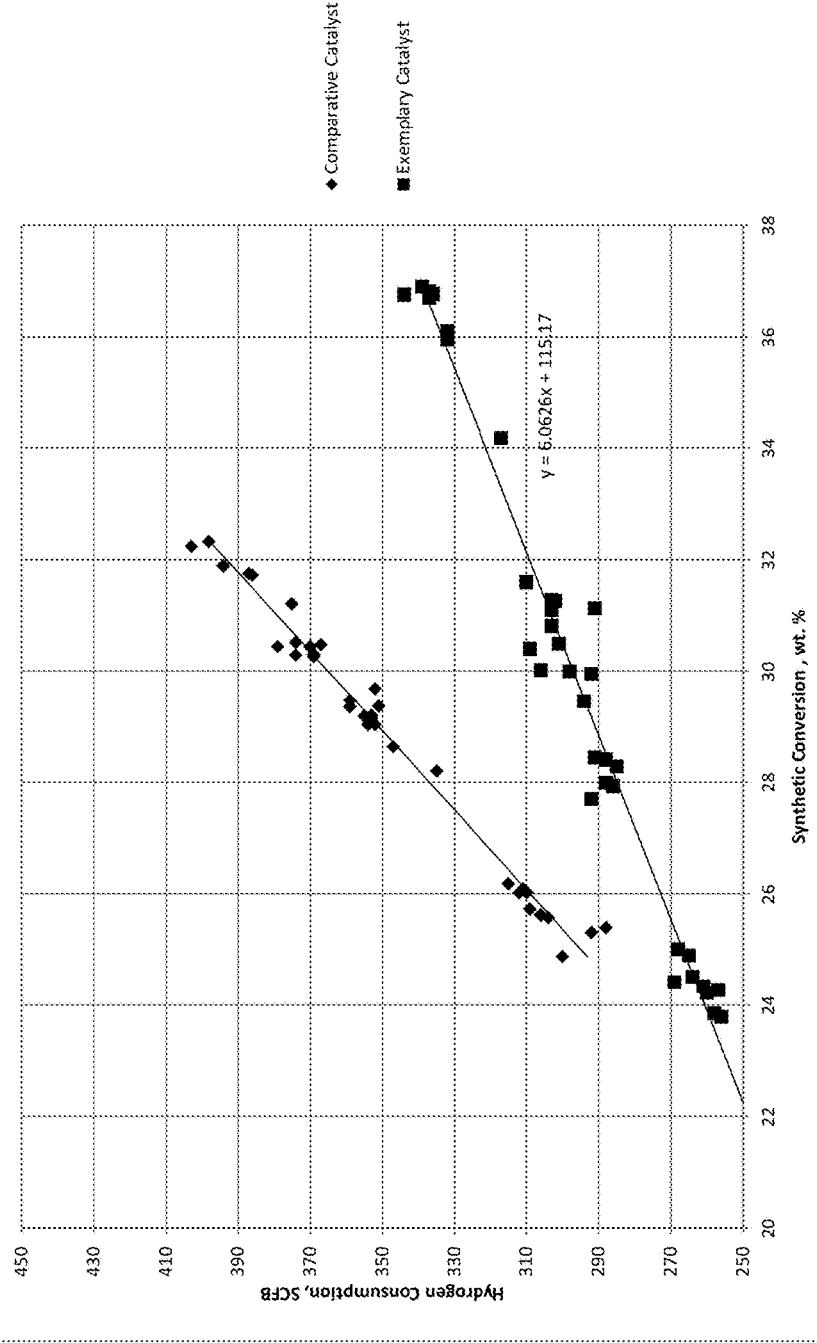
FIG. 4 is a chart showing hydrogen consumption vs. synthetic conversion less than 625° F. (329° C.) for two different second-stage hydrocracking catalysts.
Figure 5:
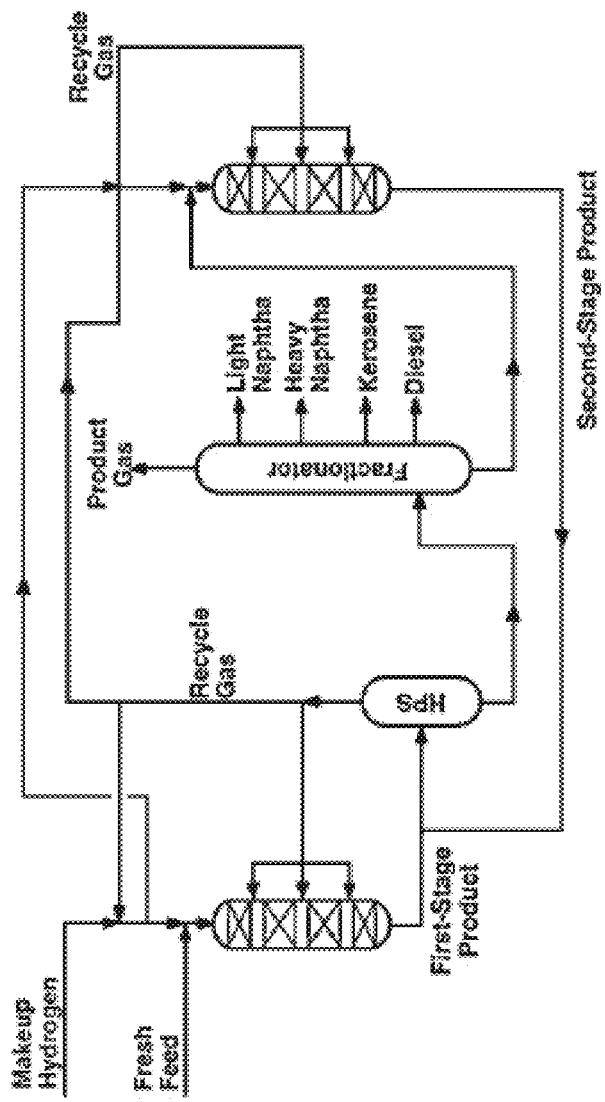
FIG. 5 is a diagram of an embodiment of a two-stage hydroprocessing unit having a second-stage hydrocracking reactor designed for optimizing yields of middle distillates.

Additional hydrocracking tests were performed using the feed described in Example 3 in the pilot plant that is shown in FIG. 4. The hydrocracking process conditions were adjusted by adjusting the reactor temperatures during the tests to achieve a range of synthetic conversion less than 625° F. (329° C.) from about 23 to 37 wt %. As in the previous tests, the hydrocracking conditions included a total pressure of 1900 psig, a LHSV of 1.92, and 6,000 SCFB gas rate. A chart showing the hydrogen consumption vs. synthetic conversion less than 625° F. (329° C.) for these hydrocracking tests done with the exemplary catalyst sample from Example 1 and the comparative catalyst sample from Example 2 is shown in FIG. 4. The hydrogen consumption in the tests using the exemplary catalyst sample were lower across the range of synthetic conversions tested, and the higher the synthetic conversion the greater the difference in the hydrogen consumption between the two different hydrocracking catalysts.

Example 6: UV Absorptivity for Stripper Bottom Products

Hydrocarbon product samples from the hydrocracking runs described in Example 4, made using the comparative catalyst sample and exemplary catalyst sample, were taken periodically during the runs. The hydrocarbon product samples were stripped by nitrogen at elevated temperatures as shown in FIG. 6 and the stripper bottoms were analyzed for UV absorbance by a method adapted from ASTM D2008-91. UV absorbance was measured using a HP 8453 spectrophotometer interfaced to an HP Chem-station. The details of the process conditions, time on stream, and UV absorbance of the stripper bottoms are shown in Table 12.

TABLE 12

UV Absorptivity for Stripper Bottoms Products

| Catalyst Sample | Comparative | Exemplary | Comparative | Exemplary | Comparative | Exemplary | Exemplary | Exemplary |
|---|---|---|---|---|---|---|---|---|
| Time on Stream, Hours | 808 | 1048 | 1288 | 1600 | 1552 | 1312 | 1672 | 1792 |
| C.A.T., ° F. (° C.) | 596 (1105) | 580 (1076) | 596 (1105) | 580 (1076) | 603 (1117) | 580 (1076) | 589 (1092) | 589 (1092) |
| LHSV | 1.17 | 1.13 | 1.15 | 1.14 | 1.15 | 1.13 | 1.14 | 1.14 |
| Total Pressure, PSIG | 1307 | 1305 | 1311 | 1318 | 1310 | 1300 | 1316 | 1311 |
| $H_2$ Rate, SCFB | 6325 | 6517 | 6442 | 6509 | 6412 | 6531 | 6508 | 6500 |
| Conv. <625 F., wt. % | 30.24 | 30.00 | 25.62 | 25.01 | 29.68 | 28.41 | 36.70 | 36.81 |

| UV Absorbance, nm | | | | | | | | |
|---|---|---|---|---|---|---|---|---|
| nm | Comparative | Exemplary | Comparative | Exemplary | Comparative | Exemplary | Exemplary | Exemplary |
| 226 | 0.03040 | 0.02886 | 0.03261 | 0.03077 | 0.04028 | 0.03026 | 0.03873 | 0.03937 |
| 255 | 0.00507 | 0.00393 | 0.00522 | 0.00404 | 0.00739 | 0.00403 | 0.00593 | 0.00600 |
| 305 | 0.02840 | 0.02689 | 0.02794 | 0.02618 | 0.02995 | 0.02657 | 0.02885 | 0.02902 |
| 340 | 0.00535 | 0.00460 | 0.00533 | 0.00452 | 0.00647 | 0.00460 | 0.00557 | 0.00561 |
| 348 | 0.00643 | 0.00577 | 0.00640 | 0.00563 | 0.00774 | 0.00574 | 0.00684 | 0.00691 |
| 385 | 0.00061 | 0.00048 | 0.00064 | 0.00048 | 0.00092 | 0.00048 | 0.00071 | 0.00071 |
| 435 | 0.00011 | 0.00011 | 0.00012 | 0.00012 | 0.00014 | 0.00011 | 0.00012 | 0.00012 |
| 450 | 0.00009 | 0.00006 | 0.00009 | 0.00007 | 0.00010 | 0.00006 | 0.00009 | 0.00008 |
| 495 | 0 | 0 | 0 | 0 | 0 | 0 | 0 | 0 |

The stripper bottoms made using the exemplary catalyst sample had lower UV absorption, which indicated that the exemplary catalyst sample was better at saturating aromatics than the comparative catalyst sample. It is theorized that the increased aromatics saturation was due to the better cracking activity of the exemplary catalyst sample, such that the C.A.T. was significantly lowered. The lower hydrocracking temperature favored aromatics saturation.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

It is claimed:

1. A second-stage hydrocracking catalyst, comprising:
   a. a zeolite beta having an OD acidity of 20 to 400 µmol/g and an average domain size from 800 to 1500 $nm^2$;
   b. a zeolite USY having an ASDI between 0.05 and 0.12;
   c. a catalyst support; and
   d. 0.1 to 10 wt % noble metal;
   wherein the second-stage hydrocracking catalyst provides a hydrogen consumption less than 350 SCFB across a range of synthetic conversions up to 37 wt % when used to hydrocrack hydrocarbonaceous feeds having an initial boiling point greater than 380° F. (193° C.).

2. The second-stage hydrocracking catalyst of claim 1; wherein a wt % of the zeolite beta is greater than the wt % of the zeolite USY.

3. The second-stage hydrocracking catalyst of claim 1, wherein the OD acidity is from 30 to 100 µmol/g.

4. The second-stage hydrocracking catalyst of claim 1, wherein the average domain size is from 900 to 1250 $nm^2$.

5. The second-stage hydrocracking catalyst of claim 1, wherein the zeolite USY has a total Brönsted acid sites determined by FTIR after H/D exchange of 0.080 to 0.200 mmol/g.

6. The second-stage hydrocracking catalyst of claim 1, wherein the second-stage hydrocracking catalyst has the hydrogen consumption between 250 and 350 SCFB over the range of synthetic conversion <625° F. (329° C.) from 23 to 37 wt %.

7. The second-stage hydrocracking catalyst of claim 1; wherein the second-stage hydrocracking catalyst has a compacted bulk density from 420 to 620 g/l.

8. The second-stage hydrocracking catalyst of claim 1, wherein the second-stage hydrocracking catalyst has a LOI (1000° F. [538° C.]) less than 12 wt %.

9. The second-stage hydrocracking catalyst of claim 1, wherein the noble metal comprises platinum, palladium, or mixture thereof.

10. A method for making the second-stage hydrocracking catalyst of claim 1, the method comprising:
    a. mixing together a zeolite beta having an OD acidity of 20 to 400 µmol/g and an average domain size from 800 to 1500 $nm^2$, a zeolite USY having an ASDI between 0.05 and 0.12, a catalyst support, and enough liquid to form an extrudable paste;
    b. extruding the extrudable paste to form an extrudate base;
    c. impregnating the extrudate base with a metal impregnation solution containing at least one noble metal to make a metal-loaded extrudate; and
    d. post-treating the metal-loaded extrudate by subjecting the metal-loaded extrudate to drying and calcination.

11. The method of claim 10, wherein a wt % of the zeolite beta is greater than the wt % of the zeolite USY in the second-stage hydrocracking catalyst.

* * * * *